(12) United States Patent
Yoshida et al.

(10) Patent No.: US 9,989,089 B2
(45) Date of Patent: Jun. 5, 2018

(54) GUIDE MECHANISM AND METHOD FOR MANUFACTURING SAME

(71) Applicant: SMC CORPORATION, Chiyoda-ku (JP)

(72) Inventors: Yasunori Yoshida, Toride (JP); Rikiya Ishikawa, Itabashi-ku (JP); Youichi Kawamura, Tsukubamirai (JP); Yoshihiro Toshimori, Moriya (JP); Motohiro Sato, Toride (JP); Nariaki Suzuki, Kita-ku (JP); Toshio Sato, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days. days.

(21) Appl. No.: 15/307,915

(22) PCT Filed: Apr. 9, 2015

(86) PCT No.: PCT/JP2015/061054
§ 371 (c)(1),
(2) Date: Oct. 31, 2016

(87) PCT Pub. No.: WO2015/174174
PCT Pub. Date: Nov. 19, 2015

(65) Prior Publication Data
US 2017/0058950 A1    Mar. 2, 2017

(30) Foreign Application Priority Data

May 15, 2014    (JP) ................................. 2014-101388

(51) Int. Cl.
*F16C 29/04*        (2006.01)
*B23K 11/00*        (2006.01)
(Continued)

(52) U.S. Cl.
CPC .............. *F16C 29/04* (2013.01); *A47B 88/00* (2013.01); *B23K 11/004* (2013.01);
(Continued)

(58) Field of Classification Search
CPC .... F16C 29/043; F16C 29/045; F16C 29/048; F16C 2226/36; B23K 11/004; B23K 11/115; A47B 88/00
(Continued)

(56) References Cited

U.S. PATENT DOCUMENTS 4,183,596 A * 1/1980 Greene ................ A47B 88/493
                                              312/286
4,701,058 A * 10/1987 Mottate ................... F16C 29/04
                                              384/45

(Continued)

FOREIGN PATENT DOCUMENTS

JP          58-22516 U      2/1983
JP          5-92505 U      12/1993
(Continued)

OTHER PUBLICATIONS

International Search Report dated Jun. 30, 2015, in Application No. PCT/JP2015/061054, filed Apr. 9, 2015.

*Primary Examiner* — Marcus Charles
(74) *Attorney, Agent, or Firm* — Oblon, McClelland, Maier & Neustadt, L.L.P.

(57)    ABSTRACT

A guide mechanism includes: a guide member having a first groove; a slide member having a second groove; and rolling bodies arranged in a guide groove comprising the first groove and the second groove. A stopper for preventing the rolling bodies from moving out of the guide groove is affixed to the second groove by welding. A method for manufacturing the guide mechanism includes a welding step in which the second groove and the stopper are welded by (Continued)

resistance welding while the stopper is pressed against the second groove.

4 Claims, 11 Drawing Sheets

(51) Int. Cl.
  *B23K 11/11* (2006.01)
  *A47B 88/00* (2017.01)
  *F16C 29/00* (2006.01)

(52) U.S. Cl.
  CPC .......... *B23K 11/115* (2013.01); *F16C 29/004* (2013.01); *F16C 29/005* (2013.01); *F16C 29/041* (2013.01); *F16C 2226/36* (2013.01)

(58) Field of Classification Search
  USPC ............... 384/18–19, 21, 36, 41, 46, 49–50; 312/333, 334.1, 334.38–334.39, 334.44, 312/334.45; 29/898.03
  See application file for complete search history.

(56) References Cited

U.S. PATENT DOCUMENTS

| | | | | |
|---|---|---|---|---|
| 4,806,022 A | * | 2/1989 | Takahiro | F16C 29/063 384/45 |
| 5,395,170 A | * | 3/1995 | Tamura | F16C 29/063 384/45 |
| 6,585,335 B2 | * | 7/2003 | Hwang | A47B 88/493 312/333 |
| 7,008,107 B2 | * | 3/2006 | Kuwabara | F16C 29/063 384/43 |
| 7,140,704 B2 | * | 11/2006 | Chen | A47B 88/493 312/333 |
| 8,152,251 B2 | * | 4/2012 | Huang | A47B 88/493 312/334.44 |
| 2013/0058599 A1 | * | 3/2013 | Brock | F16C 29/045 384/50 |
| 2014/0079346 A1 | * | 3/2014 | Chung | F16C 33/3843 384/18 |
| 2016/0312502 A1 | * | 10/2016 | Miyamoto | B60T 1/062 |

FOREIGN PATENT DOCUMENTS

| | | | | |
|---|---|---|---|---|
| JP | 9-269006 A | | 10/1997 | |
| JP | 2006-149705 A | | 6/2006 | |
| JP | 2007285315 A | * | 11/2007 | ............. F16C 29/06 |
| JP | 2010175003 A | * | 8/2010 | ............. F16C 29/06 |
| KR | 100677937 B1 | * | 1/2007 | ............... E06B 5/11 |

\* cited by examiner

GUIDE MECHANISM AND METHOD FOR MANUFACTURING SAME

CROSS REFERENCE TO RELATED APPLICATIONS

The present application is a 371 of PCT/JP2015/061054 filed Apr. 9, 2015.

TECHNICAL FIELD

The present invention relates to a guide mechanism and a method for manufacturing the same.

BACKGROUND ART

Conventionally, a guide mechanism has been used as a mechanism for smoothly guiding the relative displacement of two elements that are capable of being displaced linearly relative to each other, or alternatively, for guiding the elements with high precision. The guide mechanism can be applied to various types of machines, and as an example of one such application, a fluid pressure cylinder such as a slide actuator or the like is presented.

For example, the fluid pressure cylinder disclosed in Japanese Laid-Open Utility Model Publication No. 05-092505 is equipped with a cylinder body, a piston capable of sliding in an axial direction inside the cylinder body, a piston rod fixed to the piston and having one end which projects out from the cylinder body, and an end plate that is fixed to an end portion of the piston rod.

In addition, the fluid pressure cylinder of Japanese Laid-Open Utility Model Publication No. 05-092505 further includes a guide rail that is fixed to the cylinder body, a slide table that is capable of sliding with respect to the guide rail, a guide member that is fixed to the guide table, and a plurality of rolling bodies (roller bearings) which are arranged in a guide groove formed between the guide rail and the guide member. On one end surface of the guide member, a plate-shaped stopper is securely fixed by screws, for preventing disengagement, i.e., falling out, of the rolling bodies from the guide groove.

As disclosed in Japanese Laid-Open Utility Model Publication No. 05-092505, in the case of a structure where the stopper is fixed by screws for preventing disengagement of the rolling bodies, during the process for attachment of the stopper, a tapping process for forming screw holes is required, and a screwing operation in order for the screws to be screw-engaged in the formed screw holes is also required.

SUMMARY OF INVENTION

The present invention has been devised taking into consideration the aforementioned problems, and has the object of providing a guide mechanism and a method of manufacturing the same in which, in a guide mechanism equipped with a structure for preventing disengagement of rolling bodies from a guide groove, it is possible to reduce the number of processing and assembly steps therefore.

For achieving the above described object, a guide mechanism of the present invention includes a guide member having a linear first groove therein, a slide member configured to slide linearly with respect to the guide member, and having a linear second groove therein disposed so as to be face-to-face with the first groove, and a plurality of rolling bodies disposed in a guide groove that is constituted by the first groove and the second groove, wherein a stopper configured to prevent disengagement of the rolling bodies from the guide groove is fixed by welding in the first groove or the second groove.

According to the structure of the present invention, the stoppers are fixed by welding, not by screws. Therefore, in a process for attachment of the stoppers, there is no need for a tapping process to be performed in order to form screw holes, and a screwing operation also is unnecessary. Furthermore, the stoppers can be fixed at any arbitrary position in the first groove or the second groove. As a result, the number of processing steps and the number of assembly steps needed in order to provide the structure for preventing disengagement of the rolling bodies from the guide grooves can be reduced.

In the above-described guide mechanism, the slide member may be a plate-shaped member, and the stopper may be disposed in the second groove. In the case that the slide member is constituted from a thin member, a tapping process is difficult or impossible to perform. However, by adopting a structure in which the stoppers are fixed by welding, it becomes possible for a thin slide member to be used.

In the above-described guide mechanism, the slide member may include a flat plate-shaped base section, and side sections that project in a thickness direction of the base section from both ends of the base section in a widthwise direction thereof, and the second groove may be provided on each of inner walls of the side sections.

Further, a method of manufacturing a guide mechanism according to the present invention is characterized in that the guide mechanism includes a guide member having a linear first groove therein, a slide member configured to slide linearly with respect to the guide member, and having a linear second groove therein disposed so as to be face-to-face with the first groove, and a plurality of rolling bodies disposed in a guide groove that is constituted by the first groove and the second groove, wherein the method includes a welding step of joining a stopper and the first groove or the second groove together by resistance welding, in a state in which the stopper is pressed in abutment against the first groove or the second groove.

According to the method, since the stopper is attached by welding, not by screws, in the process of attaching the stopper, there is no need for a tapping process to be performed in order to form screw holes, and a screwing operation also is unnecessary. As a result, the number of processing steps and the number of assembly steps can be reduced. Further, since joining is performed by resistance welding, the operation to attach the stopper by welding can be carried out efficiently.

In the above-described method of manufacturing the guide mechanism, in the welding step, in a state in which the guide member or the slide member, and the stopper are sandwiched between electrodes and pressure is applied thereto, electric current may be supplied to the electrodes. In accordance with this feature, the operation to attach the stopper by welding can be performed efficiently.

In the above-described method of manufacturing the guide mechanism, in the welding step, the stopper having a spherical shape may be joined.

According to the guide mechanism and the method for manufacturing the same of the present invention, in the guide mechanism, which is equipped with a structure for preventing disengagement of the rolling bodies from the guide grooves, the number of processing steps and the number of assembly steps can be reduced.

The above and other objects, features and advantages of the present invention will become more apparent from the following description when taken in conjunction with the accompanying drawings in which a preferred embodiment of the present invention is shown by way of illustrative example.

DESCRIPTION OF EMBODIMENTS

Preferred embodiments of a guide mechanism and a method for manufacturing the same according to the present invention will be described in detail below with reference to the accompanying drawings. In the embodiments, although a slide actuator is presented as an example of a device to which the guide mechanism is applied, the range of applications of the present invention is not limited, and the invention can be applied to various devices that include movable elements capable of moving linearly.

Figure 1:
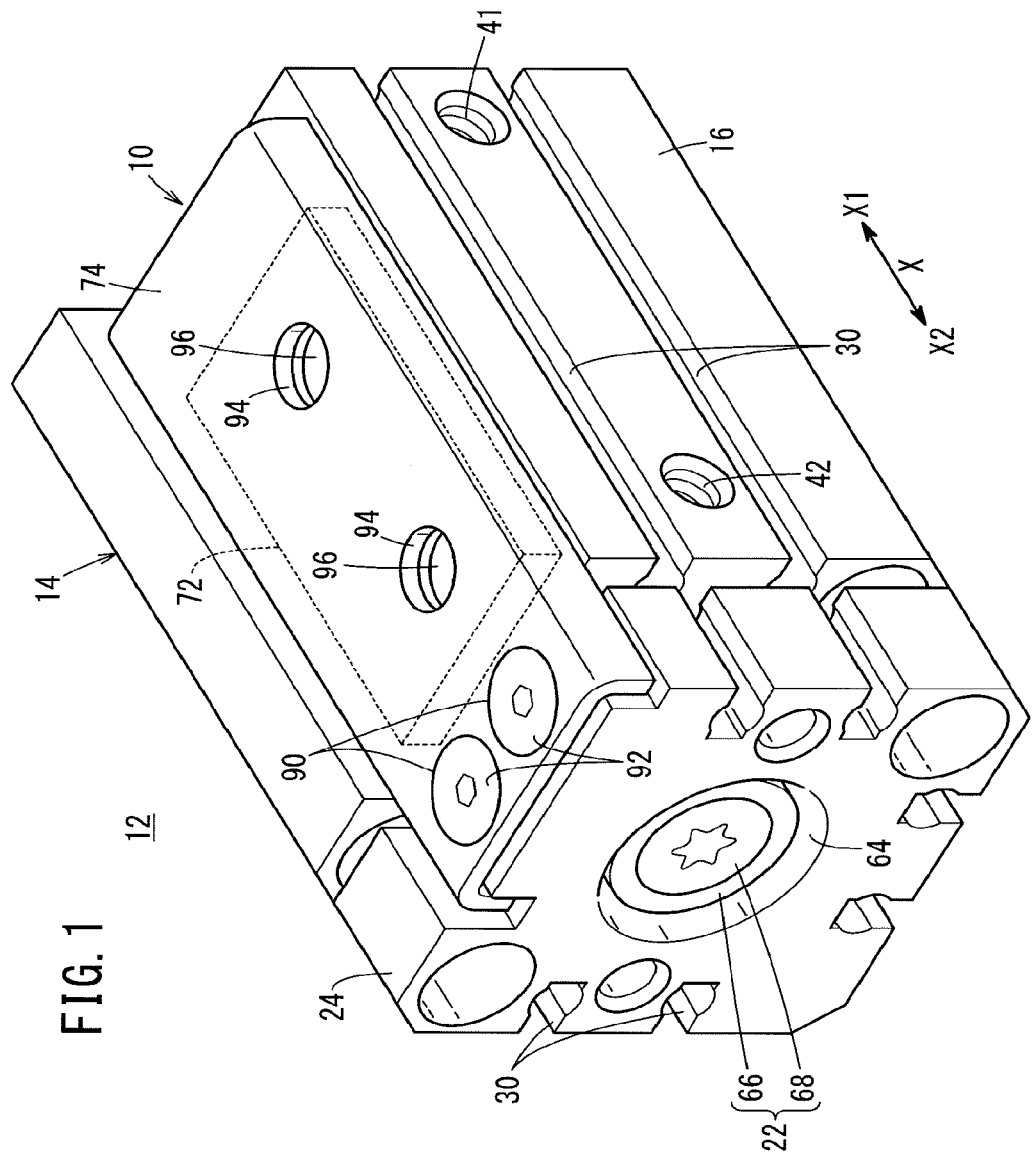
FIG. 1 is a perspective view of a slide actuator equipped with a guide mechanism according to a first embodiment of the present invention.
Figure 2:
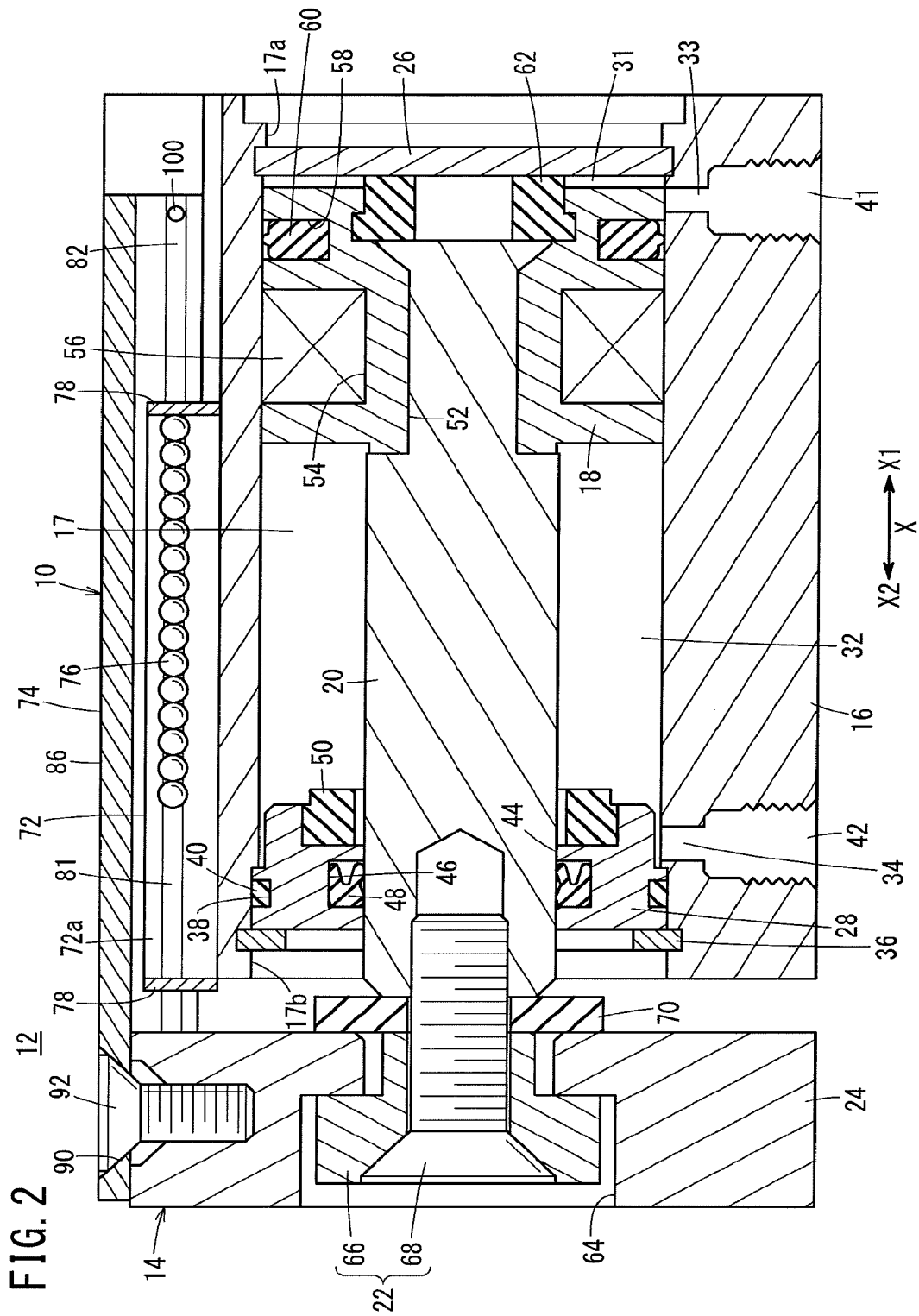
FIG. 2 is a vertical cross-sectional view of the slide actuator shown in FIG. 1.
Figure 3:
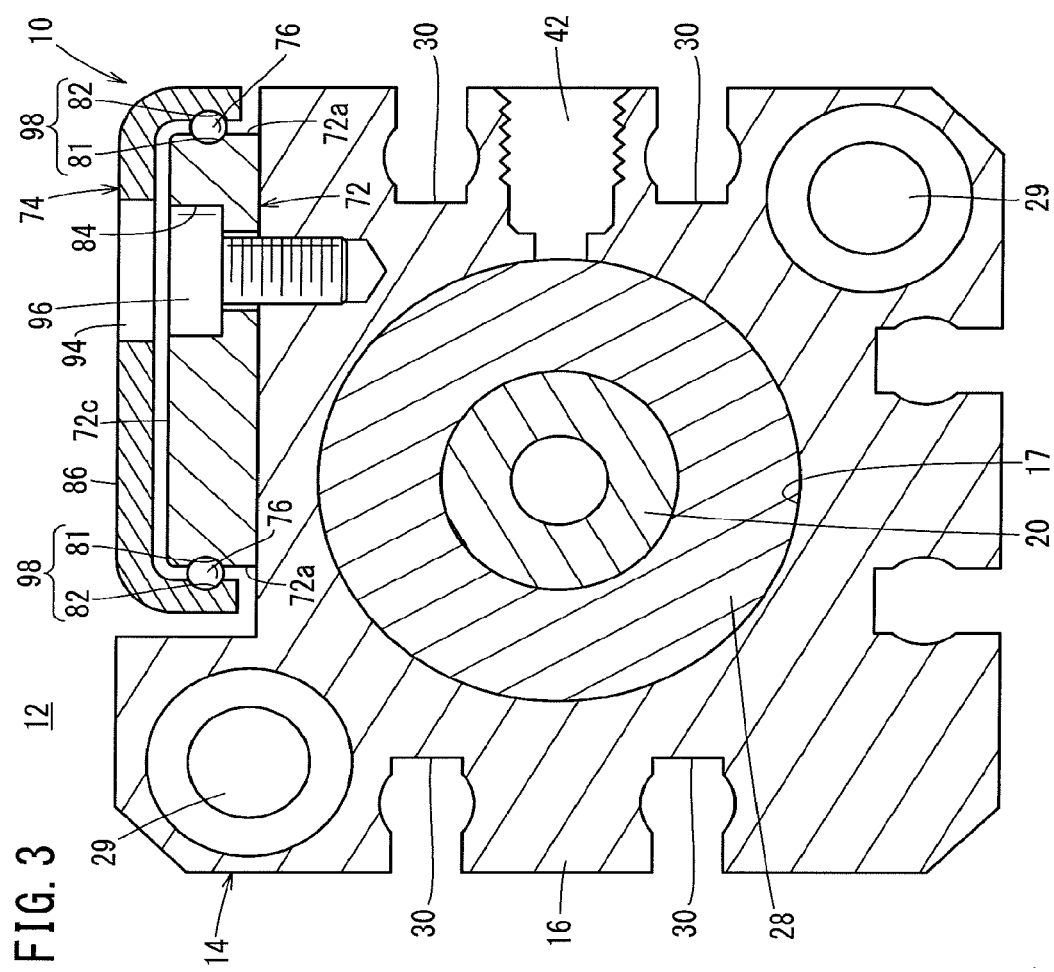
FIG. 3 is a transverse cross-sectional view of the slide actuator shown in FIG. 1.

FIG. 1 is a perspective view of a slide actuator 12 equipped with a guide mechanism 10 according to a first embodiment of the present invention. FIG. 2 is a vertical cross-sectional view of the slide actuator 12. FIG. 3 is a transverse cross-sectional view of the slide actuator 12.

The slide actuator 12 comprises an actuator main body 14, and a guide mechanism 10 that is mounted on the actuator main body 14. The slide actuator 12 is used, for example, as a transport or conveying means for a workpiece.

As shown in FIG. 2, the actuator main body 14 includes a cylinder body 16 in which a cylinder hole 17 is formed, a piston 18 that is arranged so as to be capable of sliding reciprocally in an axial direction in the interior of the cylinder hole 17, a piston rod 20 that is connected to the piston 18 on one end of the piston rod 20, and an end plate 24 that is connected to the piston rod 20 through a fixing mechanism 22 at the exterior of the cylinder body 16.

The cylinder hole 17 that is formed in the cylinder body 16 penetrates through the cylinder body 16 in the axial direction (the direction of the arrow X in the drawings). On one end of the cylinder hole 17 (an end on the X1 side), for example, a plate-shaped head cover 26 is installed in an airtight manner, whereby the one end 17a of the cylinder hole 17 is closed.

On another end of the cylinder hole 17 (an end on the X2 side), a later-described rod cover 28 is installed in an airtight manner, whereby the other end 17b of the cylinder hole 17 is closed. In the cylinder hole 17, a first pressure chamber 31 is formed between the piston 18 and the head cover 26, and a second pressure chamber 32 is formed between the piston 18 and the rod cover 28.

As shown in FIGS. 1 and 2, on one side surface of the cylinder body 16, a first port 41 and a second port 42, to and from which a pressure fluid (a gas or a liquid) is supplied and discharged, are formed perpendicularly to the axial direction of the cylinder body 16. For example, a fluid path switching device, which switches the supply state of the pressure fluid through non-illustrated piping or the like, is connected to the first port 41 and the second port 42. In addition, by selectively supplying the pressure fluid to the first port 41 or the second port 42, the piston 18 and the piston rod 20 are driven in the axial direction.

As shown in FIG. 2, the first port 41 communicates with the first pressure chamber 31 through a first communication pathway 33, whereas the second port 42 communicates with the second pressure chamber 32 through a second communication pathway 34. Accordingly, the pressure fluid supplied to the first port 41 is introduced into the cylinder hole 17 (first pressure chamber 31) through the first communication pathway 33. Further, the pressure fluid supplied to the second port 42 is introduced into the cylinder hole 17 (second pressure chamber 32) through the second communication pathway 34.

As shown in FIG. 1, sensor attachment grooves 30 that extend along the axial direction are formed on respective side surfaces of both sides of the cylinder body 16. Non-illustrated magnetic sensors are capable of being mounted in the sensor attachment grooves 30. It is noted that, in FIG. 1, two sensor attachment grooves 30 are formed in each of the side surfaces of the cylinder body 16, however, one sensor attachment groove 30 may be formed in each of the side surfaces.

As shown in FIG. 3, in the cylinder body 16, a plurality of (in the illustrated example, two) attachment holes 29 are provided that penetrate in the axial direction. By fastening non-illustrated bolts that are inserted through the attachment holes 29, the cylinder body 16 is attached to a mounting portion (not shown), whereby the slide actuator 12 is fixed to the mounting portion.

The rod cover 28 shown in FIG. 2 is an annular member which is inserted from the other end 17b side of the cylinder hole 17, and is fixed in the interior of the cylinder hole 17 by a locking ring 36 that is engaged with the inner circumferential surface of the cylinder hole 17. An annular groove 38 is formed on the outer circumferential surface of the rod cover 28, and a sealing ring 40 is installed in the annular groove 38. By the sealing ring 40, leakage of pressure fluid to the exterior through a gap between the rod cover 28 and the cylinder body 16 (the inner circumferential surface of the cylinder hole 17) is prevented.

In the center of the rod cover 28, a rod hole 44 is formed that penetrates in the axial direction, and the piston rod 20 is inserted through the rod hole 44. An annular groove 46 is formed on the inner circumferential surface of the rod cover 28, and an annular packing 48 is installed in the annular groove 46. By the packing 48, leakage of pressure fluid to the exterior through a gap between the rod cover 28 and the piston rod 20 is prevented.

On a side (a side of the second pressure chamber 32) of the rod cover 28 that faces toward the piston 18, a damper 50 that functions as a buffering means and which is made up from a resilient member, is fixed. Shocks, which occur due to collision between the piston 18 and the rod cover 28 at a time of advancement of the piston 18, are alleviated or buffered by the damper 50.

The piston 18 is a hollow member having a rod hole 52 therein. The piston 18 is fixed to one end side of the piston rod 20 by a suitable fixing means such as crimping or a bolt or the like. An annular magnet groove 54 is formed in an outer circumferential part of the piston 18, and a magnet 56 is installed in the magnet groove 54. During use of the slide actuator 12, by detecting magnetism of the magnet 56 by non-illustrated magnetic sensors that are attached to the cylinder body 16, the position of the piston 18 in the axial direction can be detected.

Further, an annular groove 58 is formed in the outer circumferential part of the piston 18, and an annular packing 60 is installed in the annular groove 58. By the packing 60, leakage of pressure fluid to the exterior through a gap between the piston 18 and the cylinder body 16 (the inner circumferential surface of the cylinder hole 17) is prevented.

As shown in FIG. 2, the magnet 56 and the packing 60 are mounted in separate grooves (the magnet groove 54 and the annular groove 58) formed at an interval in the axial direction. However, the magnet 56 and the packing 60 may be formed integrally, and the integrated magnet 56 and packing 60 may be installed in a common mounting groove.

On a side of the piston 18 that faces toward the head cover 26, a damper 62 is fixed that functions as a buffering means and is made up from a resilient member. Shocks, which occur due to collision between the head cover 26 and the piston 18 at a time of retraction of the piston 18, are alleviated or buffered by the damper 62.

The end plate 24 is fixed to the other end of the piston rod 20 through the fixing mechanism 22. A step-shaped hole 64 that penetrates in the axial direction is provided in the end plate 24. The fixing mechanism 22 includes a hollow tubular-shaped fixing member 66 that is inserted into the hole 64, and a bolt 68 that is inserted through the fixing member 66 and is screw-engaged in the other end of the piston rod 20. A spacer member 70 is interposed between the fixing member 66 and the piston rod 20. Under a tightening action of the bolt 68, the end plate 24 is fixed vertically and perpendicularly with respect to the piston rod 20 by being sandwiched between the bolt 68 and the spacer member 70.

Figure 4:
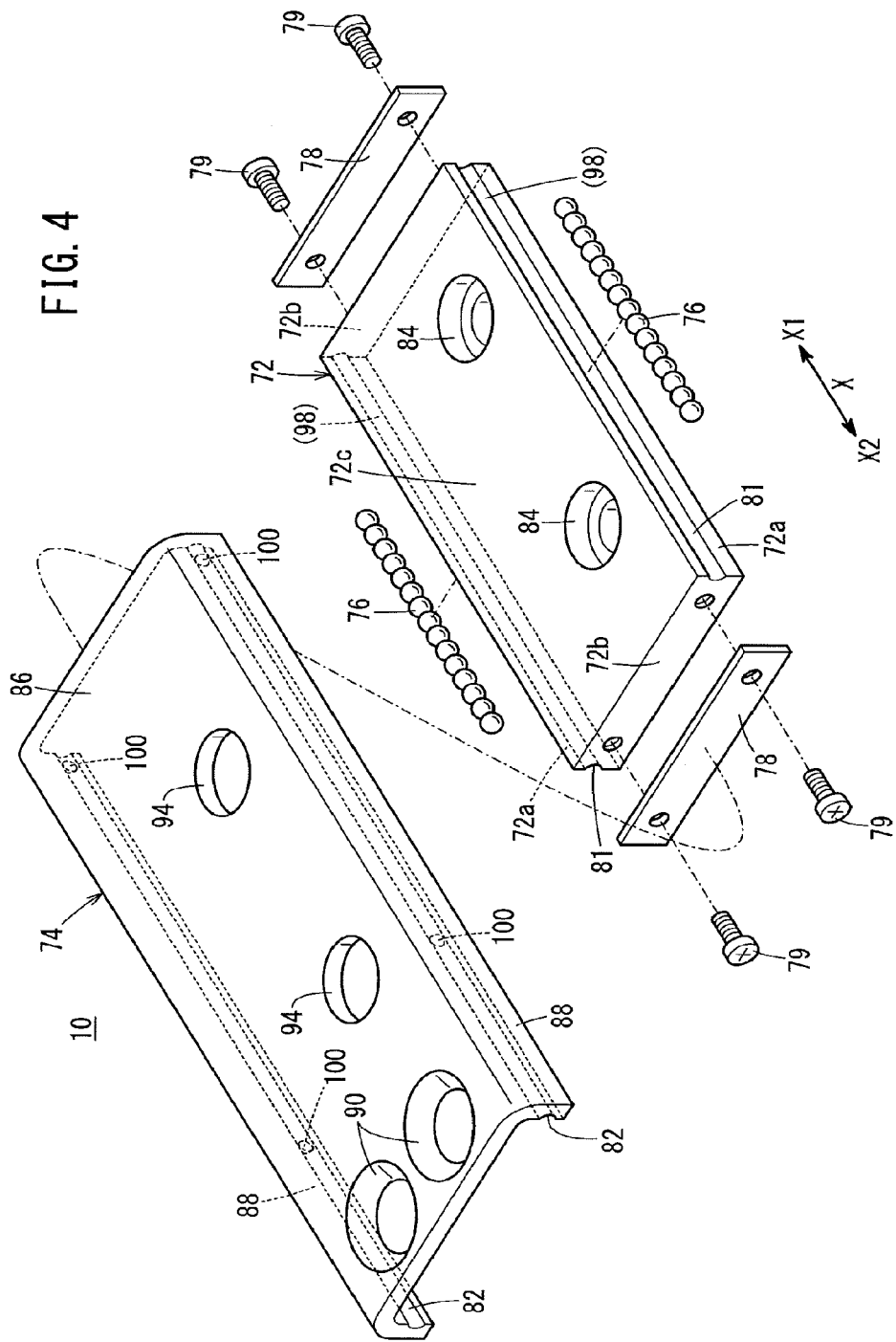
FIG. 4 is an exploded perspective view of the guide mechanism.

Next, a description will be given concerning the guide mechanism 10. FIG. 4 is an exploded perspective view of the guide mechanism 10. The guide mechanism 10 comprises a guide member 72 that is attached to a first member, a slide member 74 that is attached to a second member that is capable of being displaced relatively with respect to the first member, and a plurality of rolling bodies 76 which are arranged rollably between the guide member 72 and the slide member 74. In the case of the present embodiment, the aforementioned first member is the cylinder body 16, and the aforementioned second member is the end plate 24.

The illustrated guide member 72 extends along the axial direction (the direction of the arrow X), is wide and flat, and is a substantially quadrangle-shaped (rectangular) member as viewed in plan. The guide member 72 may be an elongate (long and narrow) member. As shown in FIGS. 2 through 4, first grooves 81 that extend linearly in the axial direction are formed on respective side surfaces 72a of the guide member 72 on both sides in the widthwise direction thereof. The illustrated first grooves 81 are semicircular shaped (arcuate) grooves. Both ends of the first grooves 81 in the direction of extension of the first grooves 81 open on both end surfaces 72b of the guide member 72 in the lengthwise direction (the direction of the arrow X) of the guide member 72.

On the respective end surfaces 72b of the guide member 72, stopper plates 78 are fixed by screws 79, for preventing disengagement, i.e., falling out, of the rolling bodies 76 from the first grooves 81. The respective stopper plates 78 are plate shaped members which are constituted with roughly the same size and shape as the respective end surfaces 72b of the guide member 72, and serve to close the end portions of the first grooves 81 on both sides in the widthwise direction of the guide member 72.

As shown in FIG. 4, a plurality of (in the illustrated example, two) step-shaped bolt holes 84 that penetrate in the thickness direction of the guide member 72 are provided in the guide member 72. By bolts 96 being inserted through the bolt holes 84 and screw-engaged in the cylinder body 16, the guide member 72 is fixed to the cylinder body 16.

The illustrated slide member 74 extends along the axial direction (the direction of the arrow X), is a substantially rectangular wide flat member as viewed in plan, and is capable of sliding in the axial direction with respect to the guide member 72. On the slide member 74, second grooves 82 are provided, which extend linearly in the axial direction so as to be face-to-face with the first grooves 81 that are provided on the guide member 72. The illustrated second grooves 82 are semicircular shaped (arcuate) grooves. Both ends of the second grooves 82 in the direction of extension thereof open on both end surfaces of the slide member 74 in the lengthwise direction (the direction of the arrow X) of the slide member 74.

In the case of the present embodiment, the slide member 74 is constituted from a plate-shaped member. More specifically, the slide member 74 includes a flat plate-shaped substantially rectangular base section 86 disposed so as to face the upper surface 72c of the guide member 72, and a pair of side sections 88 that project in a thickness direction of the base section 86 (the downward direction in FIG. 4) from both ends of the base section 86 in the widthwise direction thereof, and extend mutually in parallel with each other in the axial direction (the direction of the arrow X).

The respective side sections 88 are face-to-face with the respective side surfaces 72a in the widthwise direction of the guide member 72. The aforementioned second grooves 82 are disposed on respective inner surfaces of the pair of side sections 88 (the inner surfaces being face-to-face surfaces of the side sections 88). The second grooves 82 can be formed, for example, by a grinding process performed with respect to the inner surfaces of the side sections 88.

The slide member 74 is made up from a metal material. In order for the slide member 74 to possess sufficient rigidity, a bending process is effected on a plate-shaped member as the material of the slide member 74, whereby the plate-shaped member is formed into a shape having the aforementioned base section 86 and pair of side sections 88, and thereafter, a heating (quenching) treatment may be performed. As a metal material capable of being subject to such a quenching treatment, SUS440 according to JIS (Japanese Industrial Standards) may be offered as an example.

Holes 90 that penetrate in the thickness direction of the base section 86 are provided in the vicinity of an end of the base section 86 on the X2 direction side. By bolts 92 being inserted through the holes 90 and screw-engaged in the end plate 24, the slide member 74 is fixed perpendicularly to the end plate 24.

As shown in FIG. 4, a plurality of (in the illustrated example, two) holes 94 that penetrate in the thickness direction are provided in the base section 86 at the same interval as the bolt holes 84 that are provided in the guide member 72. The holes 94 have a size that enables the bolts 96 (see FIG. 3) to pass therethrough. In an assembly process, when the guide mechanism 10 is attached to the cylinder body 16, under a condition in which the guide member 72 and the slide member 74 are overlapped such that the plural bolt holes 84 provided in the guide member 72 and the plural holes 94 provided in the slide member 74 coincide with each other, the bolts 96 can be inserted through the holes 94 and into the bolt holes 84, and screw-engaged in the bolt holes 84. The slide member 74 is capable of sliding with respect to the guide member 72 without interference of the head portions of the bolts 96 that are screw-engaged in the bolt holes 84.

The plural rolling bodies 76 are arranged in guide grooves 98 that are formed by the first grooves 81 and the second grooves 82. In the case of the present embodiment, the guide grooves 98 are arranged on both left and right sides of the guide mechanism 10. When the slide member 74 slides in the axial direction (the direction of the arrow X) with respect to the guide member 72, the rolling bodies 76 that are arranged in the guide grooves 98 roll accompanying relative movement between the first grooves 81 and the second grooves 82, whereby the slide member 74 is capable of moving smoothly with respect to the guide member 72.

The rolling bodies 76 are not limited to being spherically shaped as shown in the illustrated example, and they may be constituted, for example, in a circular columnar shape. As the constituent material of the rolling bodies 76, stainless steel, carbon steel, or the like may be offered as examples.

Figure 5:
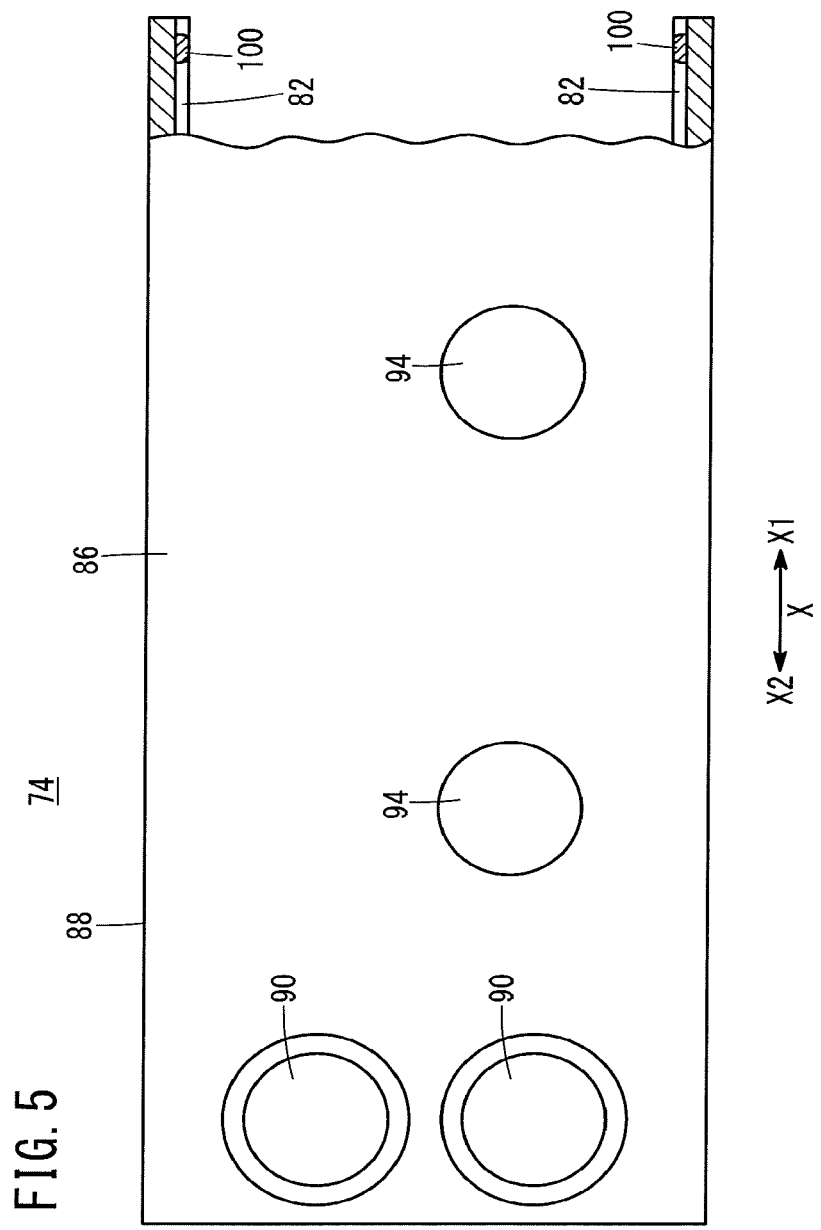
FIG. 5 is a partially cutaway plan view of a slide member.

As shown in FIGS. 4 and 5, in the second grooves 82, stoppers 100 are fixed by welding for preventing disengagement, i.e., falling out, of the rolling bodies 76 from the guide grooves 98. In the case of the present embodiment, the stoppers 100 are disposed in the second grooves 82 at positions more in the X1 direction than the rolling bodies 76, and more specifically, are disposed at positions in the vicinity of ends of the second grooves 82 on a side in the X1 direction. Since the stoppers 100 are disposed in this manner, when the slide member 74 is displaced with respect to the guide member 72 in the X2 direction to a position where the guide member 72 projects out from the end of the slide member 74 on the X1 direction side, the rolling bodies 76 become engaged with and blocked by the stoppers 100, and thus the rolling bodies 76 are prevented from escaping, i.e., slipping out, from the guide grooves 98.

In the case of the guide mechanism 10 that is provided in the slide actuator 12, because the guide member 72 does not project out from an end of the slide member 74 on the X2 direction side, it is acceptable if the stoppers 100 are not disposed in the second grooves 82 at positions more in the X2 direction than the rolling bodies 76. However, as may be needed, in the case that a configuration is adopted in which the guide member 72 projects out from an end of the slide member 74 on the X2 direction side, the stoppers 100 may be disposed in the second grooves 82 at positions more in the X2 direction than the rolling bodies 76, for example, at midway positions of the second grooves 82 (i.e., positions more in the X1 direction than the ends of the second grooves 82 on the X2 direction side) as shown in FIG. 4.

Next, a description will be given concerning the method of welding the stoppers 100, as one step of the method of manufacturing the guide mechanism 10.

Figure 6A:
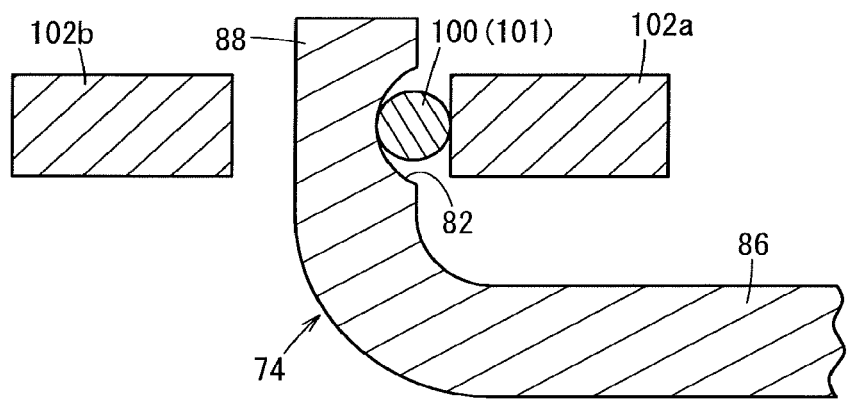
FIG. 6A is a first descriptive illustration of a stopper welding method.

As shown in FIG. 6A, as the shape of the stopper 100 prior to welding (stopper material 101), a spherical shape may be adopted. In the case of a spherical shape, supplying of the stopper material 101 to a welding machine is easily carried out. Alternatively, the shape of the stopper material 101 may be linear such as a wire or a columnar shape (roller shape). The stopper material 101 is made from a metal material, and for example, SUS304 according to JIS (Japanese Industrial Standards) is preferable because cracks do not occur therein after welding.

After the slide member 74 and the stopper material 101, which are formed in predetermined shapes, have been prepared, then as shown in FIG. 6A, the stopper material 101 is arranged at a predetermined position of the second groove 82.

Figure 6B:
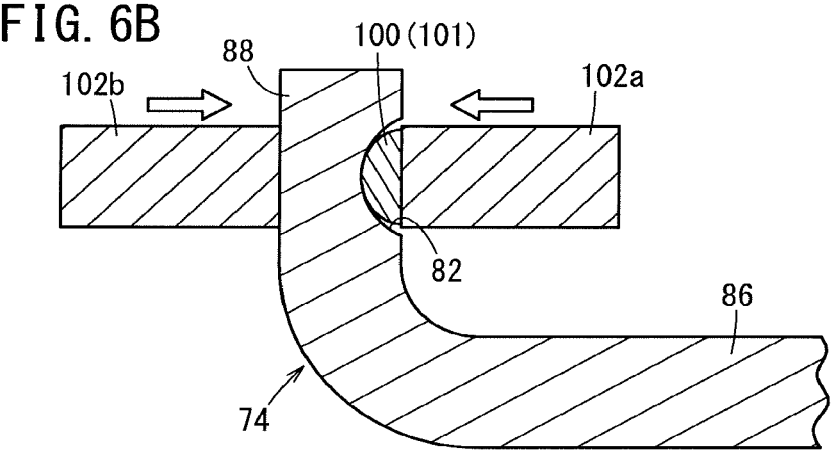
FIG. 6B is a second descriptive illustration of a stopper welding method.

Next, as shown in FIG. 6B, while the (side section 88 of the) slide member 74 and the stopper material 101 are sandwiched between two mutually confronting electrodes 102a, 102b and pressure is applied thereto, energizing or supplying of electric current is carried out for a predetermined time period. Upon doing so, accompanying the supply of electric current, Joule heat is generated in the stopper material 101, whereupon the stopper material 101 becomes softened and melted. At this time, the stopper material 101 is deformed as a result of being crushed by the pressure from the electrode 102a. In the case of FIG. 6B, the side surface of the stopper material 101 becomes flattened, and is substantially coplanar with the inner surface of the side section 88.

Figure 6C:
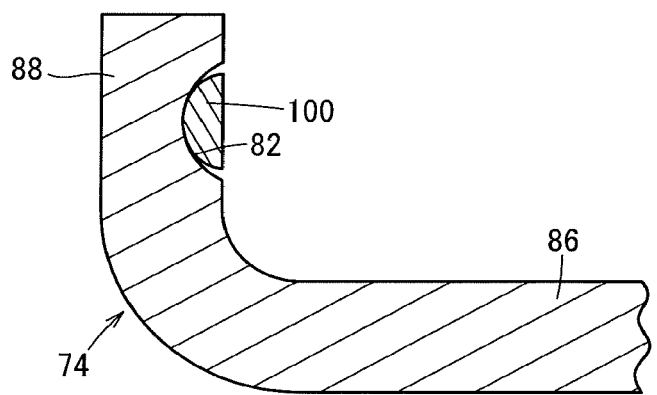
FIG. 6C is a third descriptive illustration of a stopper welding method.

After having stopped the supply of electric current, the stopper material 101 is solidified, whereby the stopper 100 is obtained which is welded in the second groove 82, as shown in FIG. 6C.

The guide mechanism 10 and the method for manufacturing the same according to the present embodiment are constituted basically as described above. Next, operations and advantageous effects thereof will be described.

According to the guide mechanism 10 that is constituted as described above and the manufacturing method therefore, the stoppers 100 are fixed by welding, not by screws. Therefore, in the process for attaching the stoppers 100, there is no need for a tapping process to be performed in order to form screw holes with respect to the member (in the case of the present embodiment, the slide member 74) in which the stoppers 100 are fixed, and a screwing operation also is unnecessary. As a result, the number of processing steps and the number of assembly steps needed in order to provide the structure for preventing disengagement of the rolling bodies 76 from the guide grooves 98 can be reduced.

In particular, in the case of the present embodiment, the slide member 74 is a thin plate-shaped member, and the stoppers 100 are arranged in the second groove 82. In the case that the slide member 74 is constituted from a thin member (for example, a plate-shaped member with a thickness on the order of 1 mm or less to several mm), a tapping process is difficult or impossible to perform. However, by adopting a structure in which the stoppers 100 are fixed by welding, it becomes possible for the thin slide member 74 to be used.

In the case of the present embodiment, since the second grooves 82 are formed by a grinding process, an oxide layer that occurs during the heating (quenching) treatment of the slide member 74 is removed by the grinding process. Therefore, during welding of the stoppers 100, a stable welding strength can be obtained.

Further, with the manufacturing method for the guide mechanism 10 according to the present embodiment, the stoppers 100 are joined by resistance welding, and therefore, fixing of the stoppers 100 with respect to the second grooves 82 can be performed efficiently. In particular, in the welding process, electric current is supplied to the electrodes in a state in which the slide member 74 and the stopper 100 are sandwiched between the electrodes 102a, 102b and pressure is applied thereto. Therefore, the attachment operation of the stoppers 100 by welding can be carried out efficiently.

As shown in FIG. 6C, when the side surfaces of the stoppers 100 are flattened and are substantially coplanar with the inner surfaces of the side sections 88, the stoppers 100 do not interfere with the guide member 72, and sliding of the slide member 74 with respect to the guide member 72 is never interrupted by the stoppers 100. Insofar as it is of a degree such that the stoppers 100 do not interfere with the guide member 72, the stoppers 100 may project out slightly from the second grooves 82.

The grinding process for forming the second grooves 82 in the side sections 88 of the slide member 74 may be carried out after the heating (quenching) treatment applied with respect to the slide member 74. If performed in this manner, since the oxide layer that occurs during the heating treatment is removed by the grinding process, a stable joining strength at the sites where the stoppers 100 are joined can be obtained.

Figure 7:
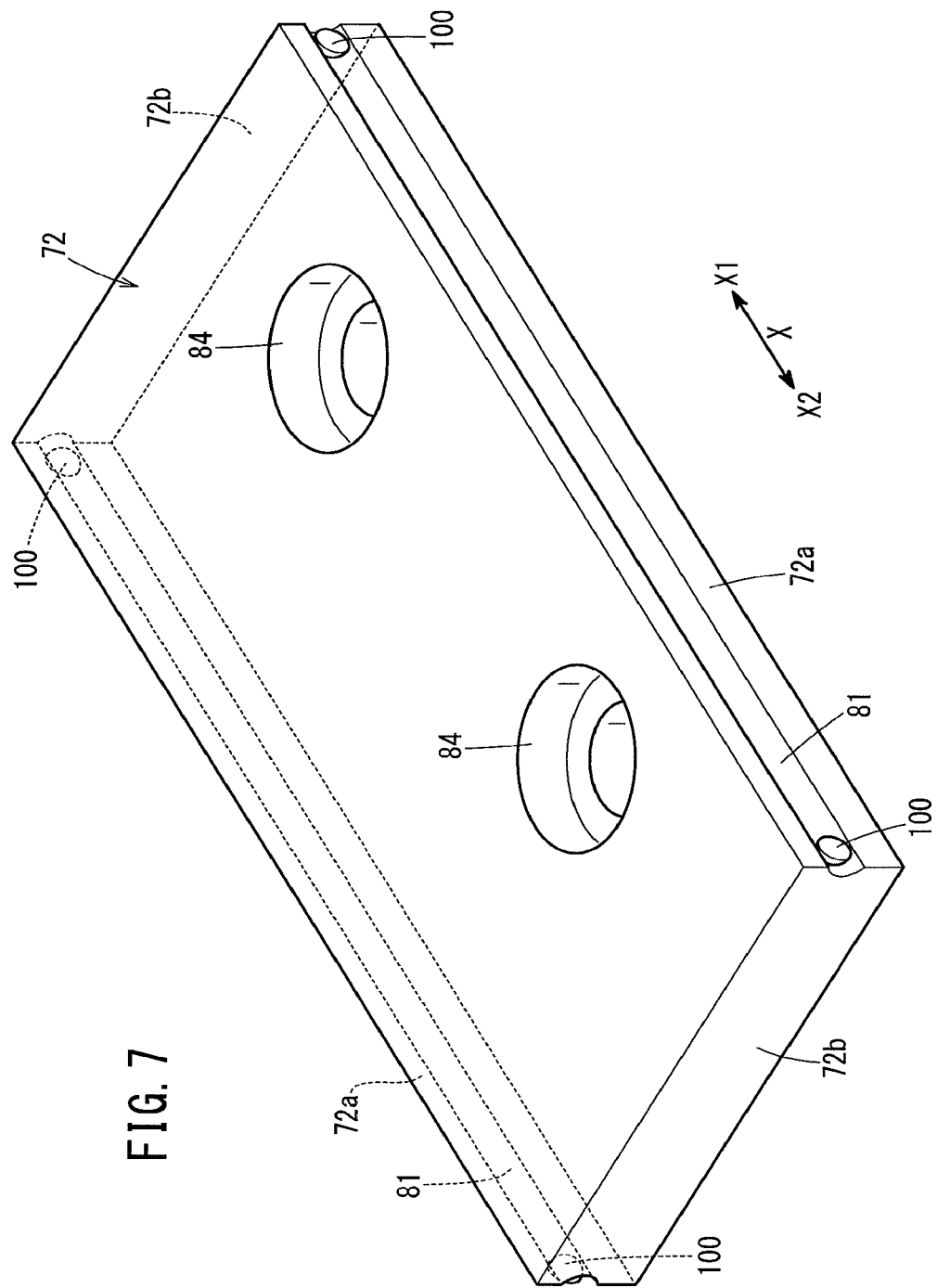
FIG. 7 is a perspective view of a guide member according to a modification.

In the above-described embodiment, the stoppers 100 are welded in the second grooves 82 that are provided on the side sections 88 of the slide member 74. However, as shown in FIG. 7, the stoppers 100 may also be welded in the first grooves 81 that are provided on the guide member 72. More specifically, instead of the stopper plates 78 which are attached to the guide member 72 by screwing (see FIG. 4), the stoppers 100 may be welded on both ends of the first grooves 81 in the direction of extension. In this case, in the same manner as the stoppers 100 that are welded in the second grooves 82, the stoppers 100 that are welded in the first grooves 81 can be welded in the first grooves 81 by resistance welding using the electrodes 102a, 102b (refer to FIGS. 6A through 6C).

By adopting such a structure in which the stoppers 100 are welded in the first grooves 81, it becomes unnecessary to perform a tapping process and a screwing operation in order to fix the stopper plates 78 with respect to the guide member 72. As a result, the number of processing steps and the number of assembly steps needed in order to provide the structure for preventing disengagement of the rolling bodies 76 from the guide grooves 98 can be reduced.

Moreover, in the case that the slide member 74 is of a thickness that enables a tapping process to easily be implemented, then instead of welding the stoppers 100 in the second grooves 82, another stopper member may be fixed by screwing to the end surface of the slide member 74 for preventing falling out of the rolling bodies 76, and the stoppers 100 may be disposed by welding only in the first grooves 81. Even in this case, the number of processing steps and the number of assembly steps needed in order to provide the structure for preventing disengagement of the rolling bodies 76 from the guide grooves 98 can be reduced.

Figure 8:
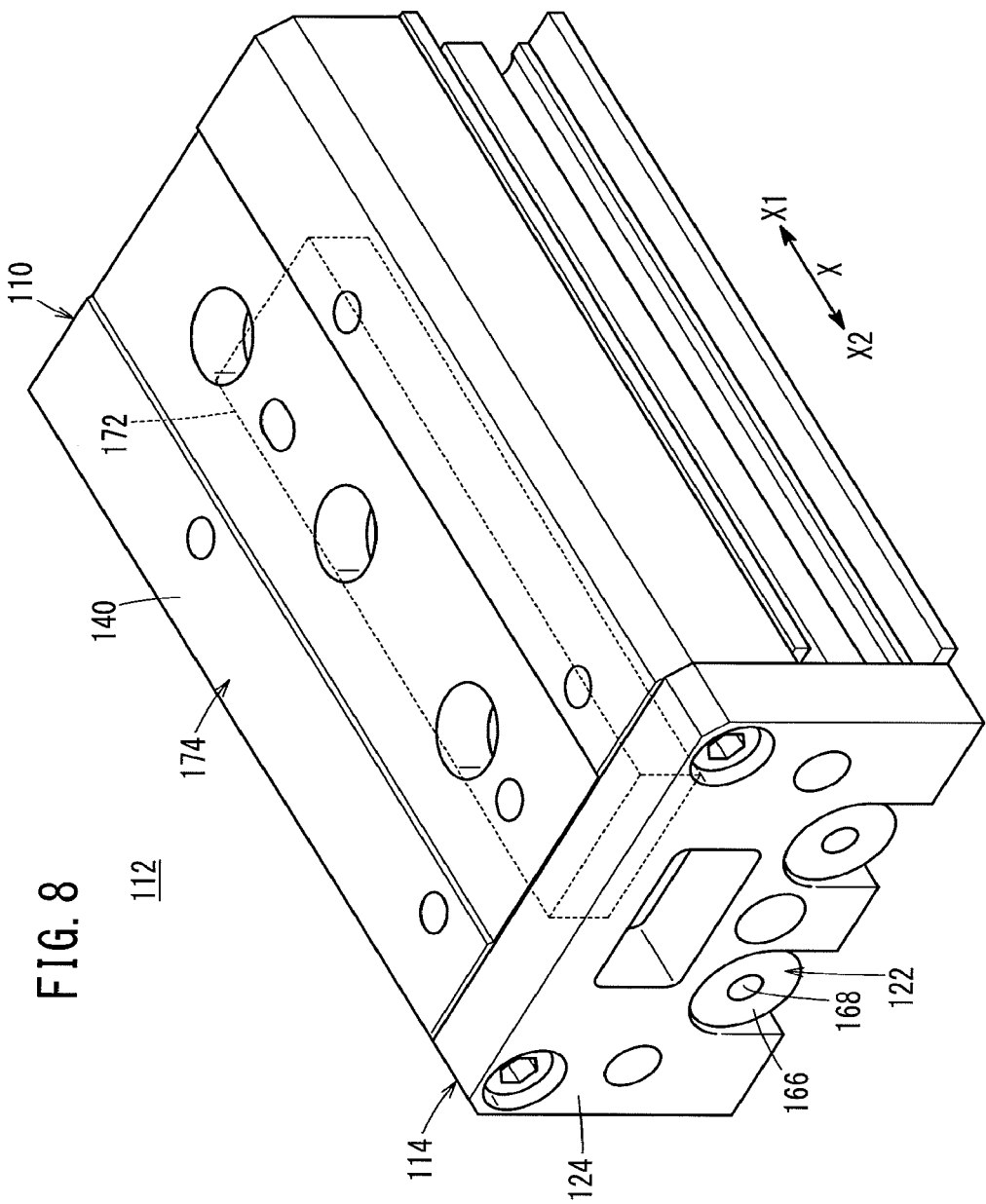
FIG. 8 is a perspective view of a slide actuator equipped with a guide mechanism according to a second embodiment of the present invention.
Figure 9:
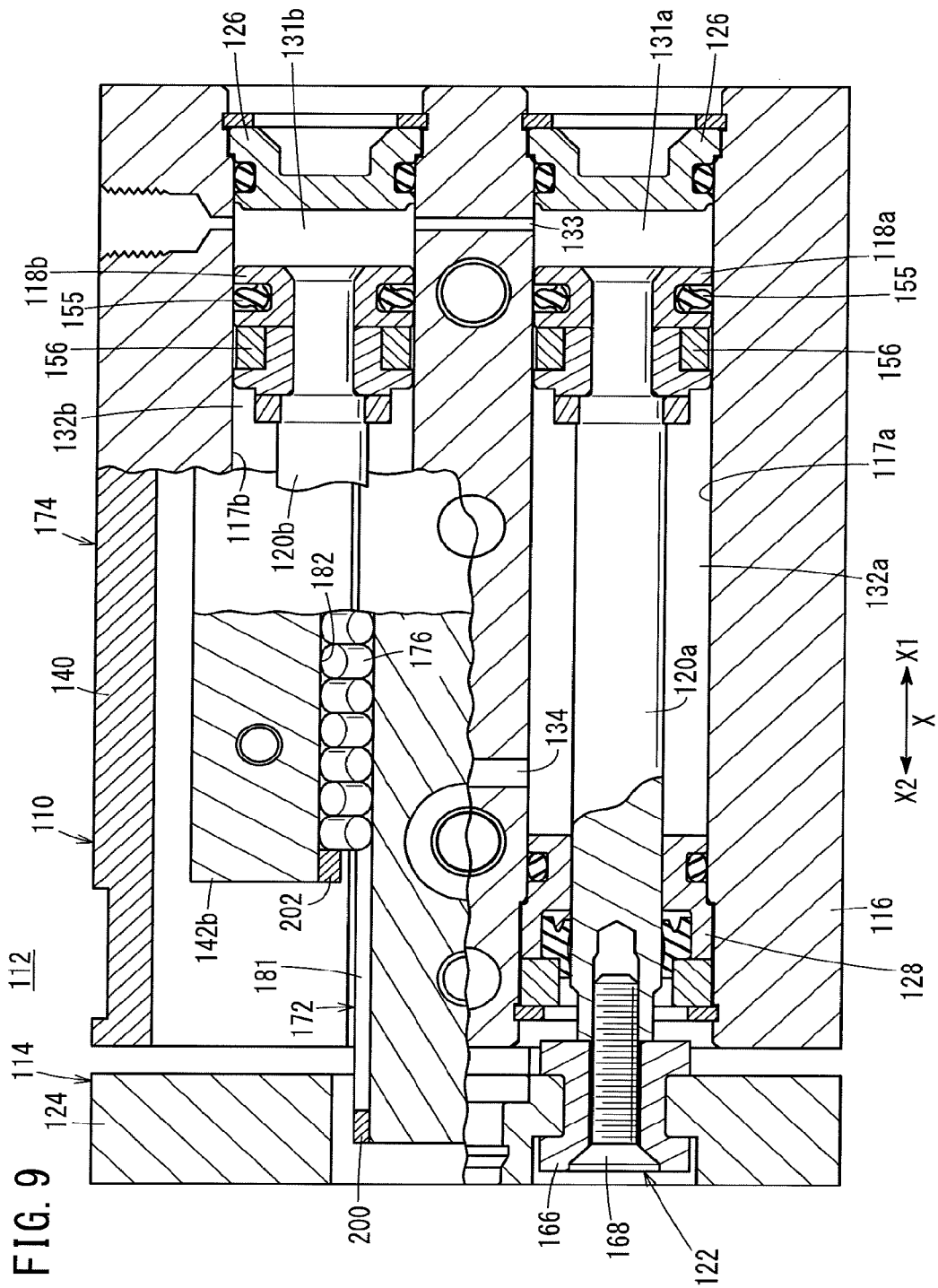
FIG. 9 is a vertical cross-sectional view of the slide actuator shown in FIG. 8.
Figure 10:
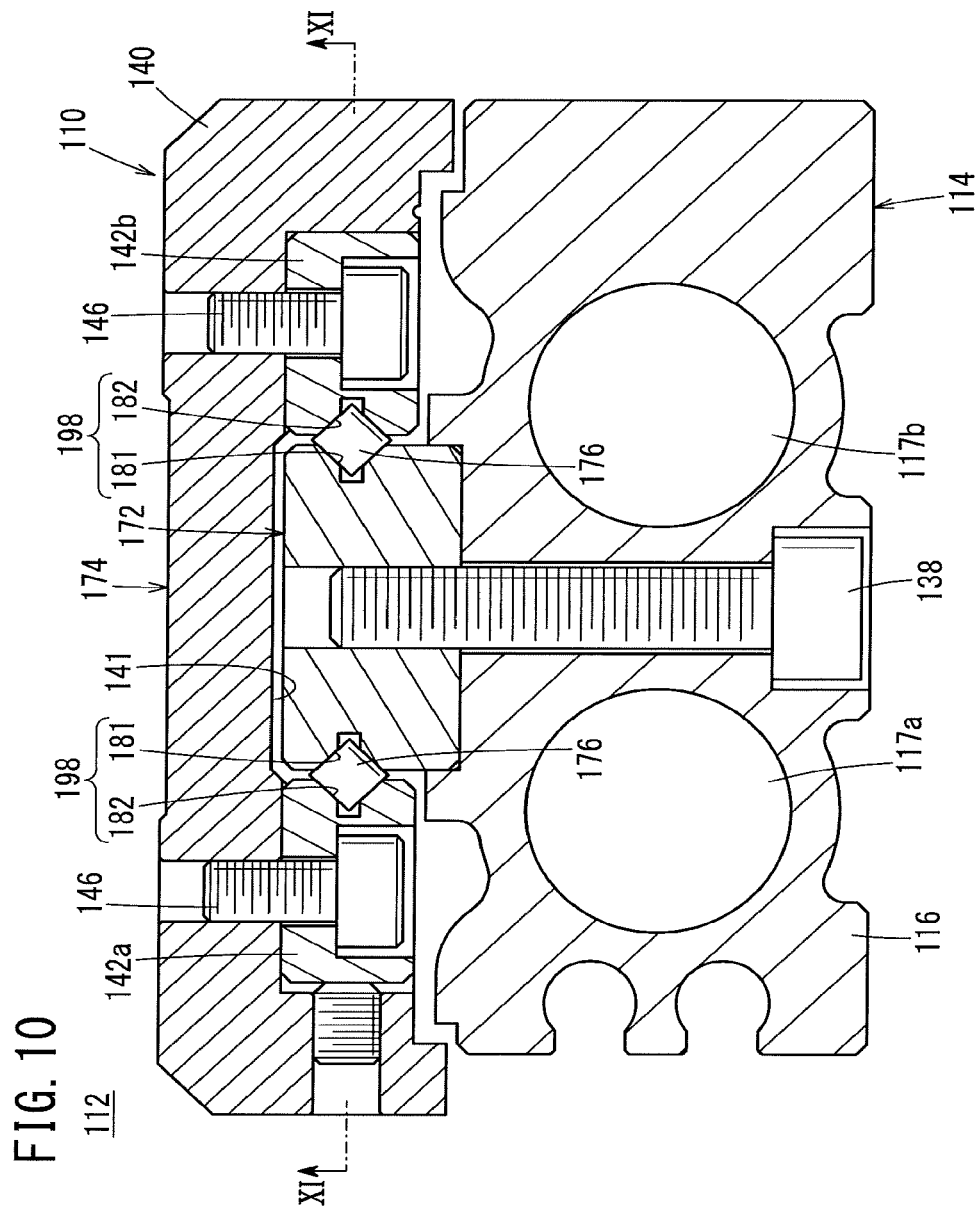
FIG. 10 is a transverse cross-sectional view of the slide actuator shown in FIG. 8.
Figure 11:
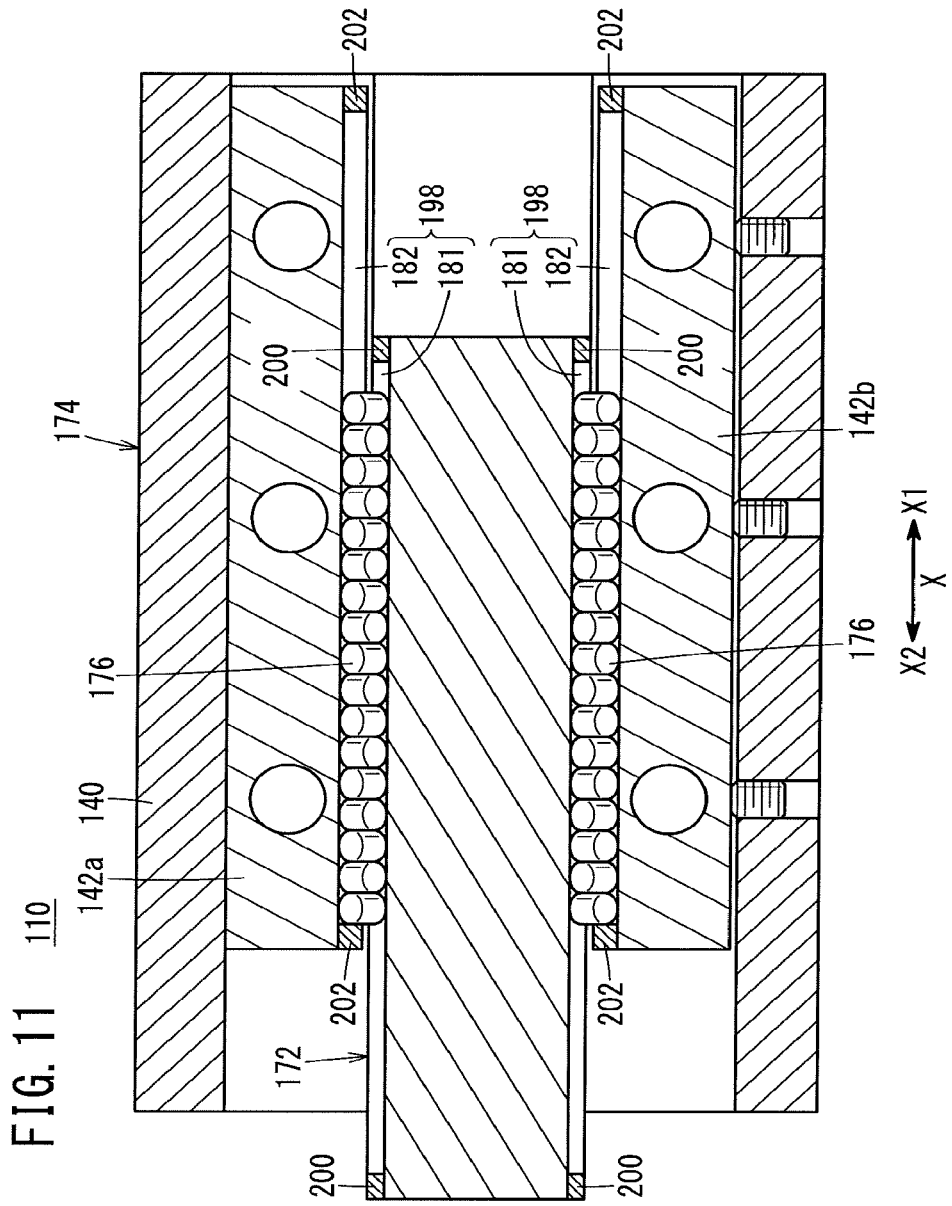
FIG. 11 is a cross-sectional view taken along line XI-XI of FIG. 10.

FIG. 8 is a perspective view of a slide actuator 112 equipped with a guide mechanism 110 according to a second embodiment of the present invention. FIG. 9 is a vertical cross-sectional view of the slide actuator 112. FIG. 10 is a transverse cross-sectional view of the slide actuator 112. FIG. 11 is a cross-sectional view taken along line XI-XI of FIG. 10.

The slide actuator 112 comprises an actuator main body 114, and a guide mechanism 110 that is mounted on the actuator main body 114. The slide actuator 112 is used, for example, as a transport or conveying means for a workpiece.

As shown in FIG. 9, the actuator main body 114 includes a cylinder body 116 in which two mutually parallel cylinder holes 117a, 117b are formed, two pistons 118a, 118b that are arranged so as to be capable of sliding reciprocally in an axial direction in the interiors of the cylinder holes 117a, 117b, two piston rods 120a, 120b that are connected to the pistons 118a, 118b on one end, and an end plate 124 that is connected to the piston rods 120a, 120b through a fixing mechanism 122 at the exterior of the cylinder body 116.

The cylinder holes 117a, 117b that are formed in the cylinder body 116 penetrate through the cylinder body 116 in the axial direction (the direction of the arrow X in the drawings). On respective ends of the cylinder holes 117a, 117b (ends on the X1 side), head covers 126 are installed in an airtight manner, whereby the ends of the cylinder holes 117a, 117b are closed.

On respective other ends of the cylinder holes 117a, 117b (ends on the X2 side), rod covers 128a, 128b are installed in an airtight manner, whereby the other ends of the cylinder holes 117a, 117b are closed. In the cylinder holes 117a, 117b, first pressure chambers 131a, 131b are formed between the pistons 118a, 118b and the head covers 126a, 126b, and second pressure chambers 132a, 132b are formed between the pistons 118a, 118b and the rod covers 128a, 128b.

The two first pressure chambers 131a, 131b communicate with each other via a communication pathway 133 that is formed in the cylinder body 116. The two second pressure chambers 132a, 132b communicate with each other via another communication pathway 134 that is formed in the cylinder body 116. By selectively supplying the pressure fluid to the first pressure chambers 131a, 131b or the second pressure chambers 132a, 132b, the two pistons 118a, 118b and the two piston rods 120a, 120b are driven in the axial direction.

The pistons 118a, 118b are hollow members. The pistons 118a, 118b are fixed respectively to one end sides of the piston rods 120a, 120b by a suitable fixing means such as crimping or bolts or the like. Packings 155 and magnets 156 are installed on outer circumferential parts of the pistons 118a, 118b.

The end plate 124 is fixed to the other ends of the piston rods 120a, 120b through a fixing mechanism 122 having a hollow tubular-shaped fixing member 166, and bolts 168 that are inserted through the fixing member 166 and screw-engaged in the other ends of the piston rods 120a, 120b.

Next, a description will be given concerning the guide mechanism 110. The guide mechanism 110 comprises a guide member 172 that is attached to a first member, a slide member 174 that is attached to a second member that is capable of being displaced relatively with respect to the first member, and a plurality of rolling bodies 176 which are arranged rollably between the guide member 172 and the slide member 174. In the case of the present embodiment, the aforementioned first member is the cylinder body 116, and the aforementioned second member is the end plate 124.

The illustrated guide member 172 extends along the axial direction (the direction of the arrow X). Moreover, the guide member 172 is wide and flat, and is a substantially square-shaped (rectangular) member as viewed in plan. The guide member 172 may be an elongate (long and narrow) member. In the case of the present embodiment, the guide member 172 is fixed to the cylinder body 116 by bolts 138 (see FIG. 10).

V-shaped first grooves 181 that extend linearly in the axial direction are provided on both sides in the widthwise direction of the guide member 172. Both ends of the first grooves 181 in the direction of extension open on both end surfaces in the lengthwise direction (the direction of the arrow X) of the guide member 172.

The illustrated slide member 174 extends along the axial direction (the direction of the arrow X), is a substantially rectangular wide flat member as viewed in plan, and is capable of sliding in the axial direction with respect to the guide member 172. In the case of the present embodiment, the slide member 174 includes a slide table 140 that is fixed to the end plate 124, and a pair of mutually parallel slide guides 142a, 142b, which are attached to the slide table 140.

A recessed section 141 (see FIG. 10) is disposed on an inner side of the slide table 140, and the pair of slide guides 142a, 142b is fixed with respect to the recessed section 141 by bolts 146. On the respective slide guides 142a, 142b, V-shaped second grooves 182 are provided, which extend linearly in the axial direction so as to be face-to-face with the first grooves 181 that are provided on the guide member 172. Both ends of the second grooves 182 in the direction of extension open on both end surfaces in the lengthwise direction (the direction of the arrow X) of the slide member 174.

The plural rolling bodies 176 are arranged in square-shaped spaces (guide grooves 198) that are formed by the first grooves 181 and the second grooves 182. In the case of the present embodiment, the guide grooves 198 are arranged on both left and right sides of the guide mechanism 110, whereas the rolling bodies 176 are circular columnar shaped members, respectively. The plural rolling bodies 176 are disposed in the left and right guide grooves 198 in a state of being inclined alternately at 90°.

As shown in FIG. 11, in the first grooves 181 that are provided in the guide member 172, stoppers 200 are fixed by welding for preventing disengagement, i.e., falling out, of the rolling bodies 176 from the guide grooves 198. In the case of the present embodiment, the stoppers 200 are disposed in the first grooves 181 at positions more in the X1 direction, and at positions more in the X2 direction than the rolling bodies 176. More specifically, the stoppers 200 are arranged in the vicinity of both opposite ends of the first grooves 181. Since the stoppers 200 are disposed in this manner, the rolling bodies 176 are prevented from escaping, i.e., slipping out, from the first grooves 181.

In the second grooves 182 that are provided in the slide guides 142a, 142b of the slide member 174, stoppers 202 are fixed by welding for preventing disengagement, i.e., falling out, of the rolling bodies 176 from the guide grooves 198. In the case of the present embodiment, the stoppers 202 are disposed in the second grooves 182 at positions more in the X1 direction, and at positions more in the X2 direction than the rolling bodies 176. More specifically, the stoppers 202 are arranged in the vicinity of both opposite ends of the second grooves 182. Since the stoppers 202 are disposed in this manner, the rolling bodies 176 are prevented from escaping, i.e., slipping out, from the second grooves 182.

The stoppers 200, 202 can be welded with respect to the guide member 172 and the slide guides 142a, 142b using the same method as that of the welding method for the aforementioned stoppers 100 (refer to FIGS. 6A through 6C).

As has been described above, with the guide mechanism 110 according to the present embodiment, the stoppers 200, 202 are fixed by welding, not by screws. Therefore, the same effects and advantages as those of the guide mechanism 10 according to the first embodiment can be obtained. More specifically, in the process for attaching the stoppers 200, 202, there is no need for a tapping process to be performed in order to form screw holes with respect to the members (in the case of the present embodiment, the slide member 174 and the slide guides 142a, 142b) in which the stoppers 200, 202 are fixed, and a screwing operation also is unnecessary. As a result, the number of processing steps and the number of assembly steps needed in order to provide the structure for preventing disengagement of the rolling bodies 176 from the guide grooves 198 can be reduced.

Although preferred embodiments of the present invention have been described above, the present invention is not limited to these embodiments, and it goes without saying that various changes and modifications may be made without departing from the scope of the invention as set forth in the appended claims.

The invention claimed is:

1. A guide mechanism comprising:
    a guide member having a linear first groove therein;
    a slide member configured to slide linearly with respect to the guide member, and having a linear second groove therein disposed so as to be face-to-face with the first groove; and
    a plurality of rolling bodies disposed in a guide groove that is constituted by the first groove and the second groove;
    wherein a stopper configured to prevent disengagement of the rolling bodies from the guide groove is fixed by welding in the first groove or the second groove, wherein:
    the slide member is a plate-shaped member,
    the stopper is disposed in the second groove,
    the slide member includes a flat plate-shaped base section, and side sections that project in a thickness direction of the base section from both ends of the base section in a widthwise direction thereof,
    the second groove is provided on each of inner walls of the side sections,
    the second groove is recessed with respect to each of inner walls of the side sections and a thickness of the side sections at the second groove is thinner than other portions of the side sections,
    the stopper has a first side that touches a bottom of the second groove and a second side that is opposite to the first side and is flat.

2. A method of manufacturing a guide mechanism, wherein the guide mechanism comprises:
    a guide member having a linear first groove therein;
    a slide member configured to slide linearly with respect to the guide member, and having a linear second groove therein disposed so as to be face-to-face with the first groove; and
    a plurality of rolling bodies disposed in a guide groove that is constituted by the first groove and the second groove;
    wherein the method comprises a welding step of joining a stopper and the first groove or the second groove together by resistance welding, in a state in which the stopper is pressed in abutment against the first groove or the second groove.

3. The method of manufacturing a guide mechanism according to claim 2, wherein, in the welding step, in a state in which the guide member or the slide member, and the stopper are sandwiched between electrodes and pressure is applied thereto, electric current is supplied to the electrodes.

4. The method of manufacturing a guide mechanism according to claim 2, wherein, in the welding step, the stopper having a spherical shape is joined.

* * * * *